United States Patent [19]
Drupsteen et al.

[11] Patent Number: 5,856,659
[45] Date of Patent: Jan. 5, 1999

[54] METHOD OF SECURELY MODIFYING DATA ON A SMART CARD

[75] Inventors: Michel Marco Paul Drupsteen, Alkmaar; Frank Muller, Delft, both of Netherlands

[73] Assignee: Koninklijke PTT Nederland N.V., Groningen, Netherlands

[21] Appl. No.: 814,479

[22] Filed: Mar. 10, 1997

[30] Foreign Application Priority Data

Mar. 11, 1996 [EP] European Pat. Off. .............. 96200658

[51] Int. Cl.⁶ .................................................. G07F 7/10
[52] U.S. Cl. ............................................ 235/380; 235/379
[58] Field of Search ...................................... 235/379, 380

[56] References Cited

U.S. PATENT DOCUMENTS 5,161,231  11/1992  Iijima ..................................... 395/800

FOREIGN PATENT DOCUMENTS

| 0 218 176 | 4/1987 | European Pat. Off. . |
| 0 484 603 A1 | 5/1992 | European Pat. Off. . |
| 0 559 205 A1 | 8/1993 | European Pat. Off. . |
| 41 19 924 A1 | 12/1992 | Germany . |

*Primary Examiner*—F. L. Evans
*Attorney, Agent, or Firm*—Oblon, Spivak, McClelland, Maier & Neustadt, P.C.

[57] ABSTRACT

A method of securely transferring data, such as program data, to a smart card (1) is disclosed. In order to be applicable in non-secure environments, the method of the invention involves a one-way authentication mechanism, comprising the use of a series of interrelated authentication values (R0, R1, R2, ... ). Further security is achieved by using commands (INIT, TRAN) which are each provided with an authentication code (MAC0, MAC1, ... ). In order to transfer data only to selected cards, the card may accept transfer commands only if a card profile (CP) matches a distribution profile (DP).

12 Claims, 4 Drawing Sheets

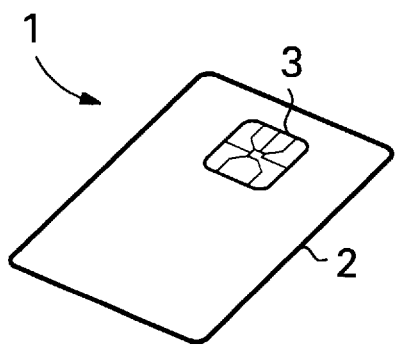
Fig. 1
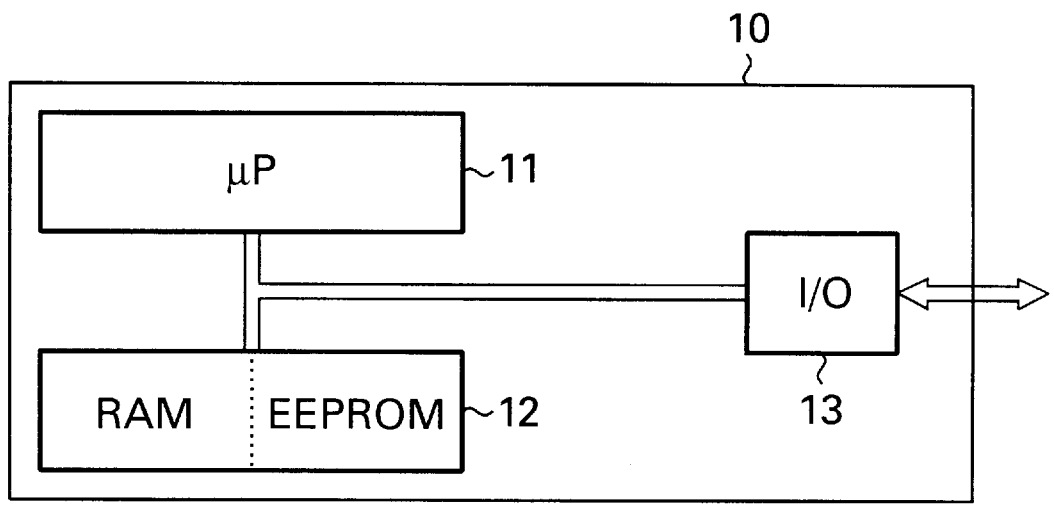
Fig. 2
| COMMANDS |
|---|
| INIT (R0, N, ...), MAC0 |
| TRAN (R1, 1, DATA1, ...), MAC1 |
| TRAN (R2, 2, DATA2, ...), MAC2 |
| ........................., ......... |
| TRAN (R[N], N, DATA[N], ...), MAC[N] |
Fig. 3

METHOD OF SECURELY MODIFYING DATA ON A SMART CARD

BACKGROUND OF THE INVENTION

The present invention relates to a method of securely modifying data on a smart card. More specifically, the present invention relates to a method of securely loading or deleting data, and creating and deleting data structures, on a smart card, which method is also applicable in environments where so-called challenge—signed response authentications are not possible. The data concerned may comprise either executable (program) data, i.e. commands, or static (non-program) data, or both. The so-called static data may comprise file structures and/or data structures.

In modern payment systems, the use of electronic payment means becomes increasingly important. Electronic payment means, such as memory cards and smart cards (generally called IC cards), are gaining acceptance as their applications are expanded. In many countries electronic cards are being used for public telephones and the like. Advanced cards are capable of containing electronic "purses", in addition to other functionalities. Such advanced payment means contain, in addition to a memory, a processor capable of running suitable programs.

It should be noted that in this text, the terms smart card or card will be used to denote electronic payment means having at least one integrated electronic circuit comprising a processor and a memory. The actual shape of a so-called smart card is not of importance.

The programs running on the processor of a smart card determine the services offered by the card, that is, the functions and associated data structures (e.g. purse, user identification, loyalty program) of the smart card depend on the software present in the card. As time passes, the need often arises to update the programs of the card, for example in order to add a new function or to improve an existing function. To this end, the card should be able to accept new programs which may replace other programs. However, it must be ascertained that the newly loaded programs are valid. Authentication of programs can relatively easily be accomplished by using a secure data exchange protocol where data are exchanged between a card and a secure terminal (having, for instance, a so-called security module in which keys and other data are securely stored). Such a secure protocol may comprise a challenge-signed response protocol. Examples of protocols for exchanging data between a smart card and a terminal are disclosed in e.g. U.S. Pat. No. 5,161,231 and European Patent Application 0,559,205 (corresponding with U.S. Pat. No. 5,369,760), which are incorporated by reference in this text.

However, in case a secure terminal is not present, such a secure protocol involving e.g. a challenge-signed response cannot be used, as the security of such a protocol depends on the trustworthiness of the terminal.

SUMMARY OF THE INVENTION

It is an object of the invention to overcome the above-mentioned and other disadvantages of the prior art and to provide a method which allows data to be loaded in a smart card in a secure manner, even in non-secure environments. It is a further object of the invention to provide a method for securely transferring data to a smart card, which method comprises a one-way authentication mechanism. It is still a further object of the invention to provide a method for securely transferring data to a smart card, which method comprises a store and forward protocol.

To achieve these and other objectives, a method of securely modifying data in a smart card comprises according to the present invention the steps of producing an initiation command comprising an initial authentication value and producing an initial authentication code based on the command and the initial value, producing at least one transfer command comprising data to be transferred and producing a subsequent authentication code based on both the command and a subsequent authentication value derived from the initial value, transferring the commands and their authentication codes thus produced to the smart card, authenticating the commands in the smart card by checking the authentication codes and checking the subsequent authentication values derived from the initial value, and storing the transferred data in the card.

That is, the initiation command provides the card with an initial authentication value, which value is also used to produce the subsequent authentication values comprised in the transfer commands. By deriving the subsequent values and comparing these derived values with the values comprised in the received transfer commands, the card can effectively check the authenticity of the received commands. In addition, an authentication code, such as a "hash", parity bits or a message authentication code (MAC) in general, is used to verify the authenticity of the received commands. Thus an additional protection is provided which is especially advantageous when the data transferred comprise card commands having no built-in protection mechanism, i.e. for protectedly transferring unprotected commands. The combination of the use of authentication values and authentication codes, as set out above, provides an effective protection against the fraudulent manipulation of the data transferred.

In order to achieve a further check mechanism, the initiation command preferably further comprises the number of transfer commands. This enables the card to check whether all transfer commands have been received, and prevents the unnoticed loss of transferred data.

Advantageously, the initiation command is arranged to prohibit the card from accepting commands other than transfer commands. In this way the transfer of data to the card can not be interrupted by the execution of other commands. Also, it is prevented that partially transferred data are manipulated.

Preferably, each transfer command further comprises a sequence number. This allows not only a check on the uninterrupted receipt, in the correct order, of the transfer commands, but also provides the possibility to retransmit a limited number of transfer commands if transmission errors (as detected by e.g. the authentication codes) have occurred. It further provides the possibility to undo a number of transfer commands.

The transfer commands may in principle be used to transfer any kind of data. The transfer data may thus not only comprise e.g. monetary balances and lists of telephone numbers (static data), but also one or more card commands (executable data). Such commands may e.g. comprise an UPDATE command which updates one or more memory locations, or a CREATE command which allocates memory locations. Apart from existing commands, new card commands may also be comprised in the transferred data. A card command may be stored in memory, but may also be directly executed upon transfer to the card. In this way an efficient way of modifying the memory contents of the card is achieved.

BRIEF DESCRIPTION OF THE DRAWINGS

FIG. 1 schematically shows a smart card as may be used in the method of the present invention.

FIG. 2 schematically shows the integrated circuit of the smart card of FIG. 1.

FIG. 3 schematically shows the commands as may be used in the method of the present invention.

EXEMPLARY EMBODIMENTS

Figure 4:
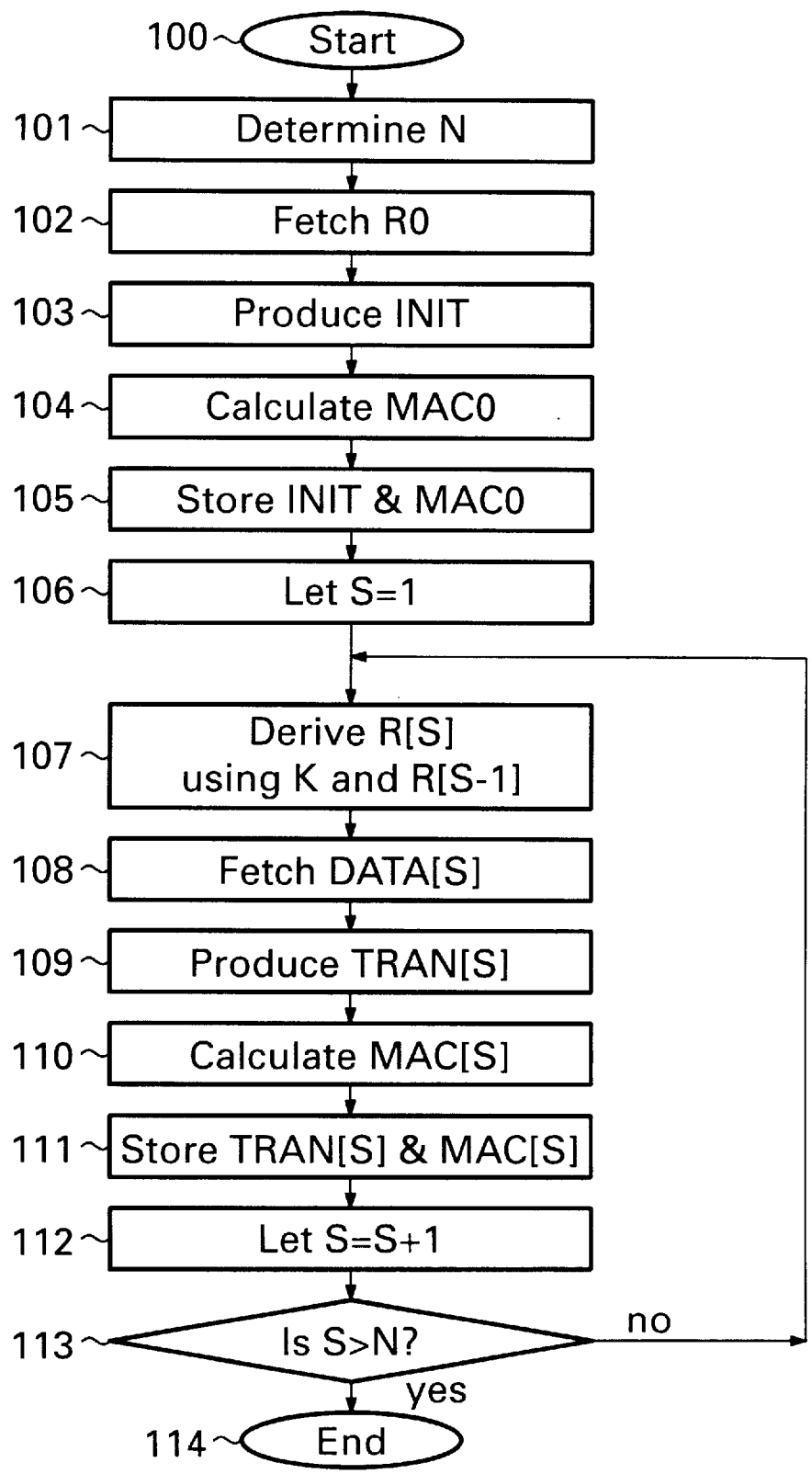
FIG. 4 schematically shows by way of example how a set of commands may be produced according to the method of the present invention.

The smart card or IC card 1 shown schematically and by way of example in FIG. 1 comprises a substrate 2, in which an integrated circuit is embedded. The integrated circuit is provided with contacts 3 for contacting a card reader or the like. It should be noted that the present invention can also be applied in the case of so-called contactless smart cards.

The integrated circuit 10 shown schematically and by way of example in FIG. 2 comprises a processor 11, a memory 12 and an input/output circuit 13. The memory may comprise a volatile (RAM) memory part for temporarily storing data and a non-volatile (ROM) memory part for permanently or semi-permanently storing data. The latter part is preferably an EEPROM type memory. The data stored in the non-volatile part may contain both programming data (instructions, programs) and payment data, i.e. data relating to monetary transactions. It will be understood that a separate memory (not shown) may be provided to store the instructions of the processor 11.

Figure 5:
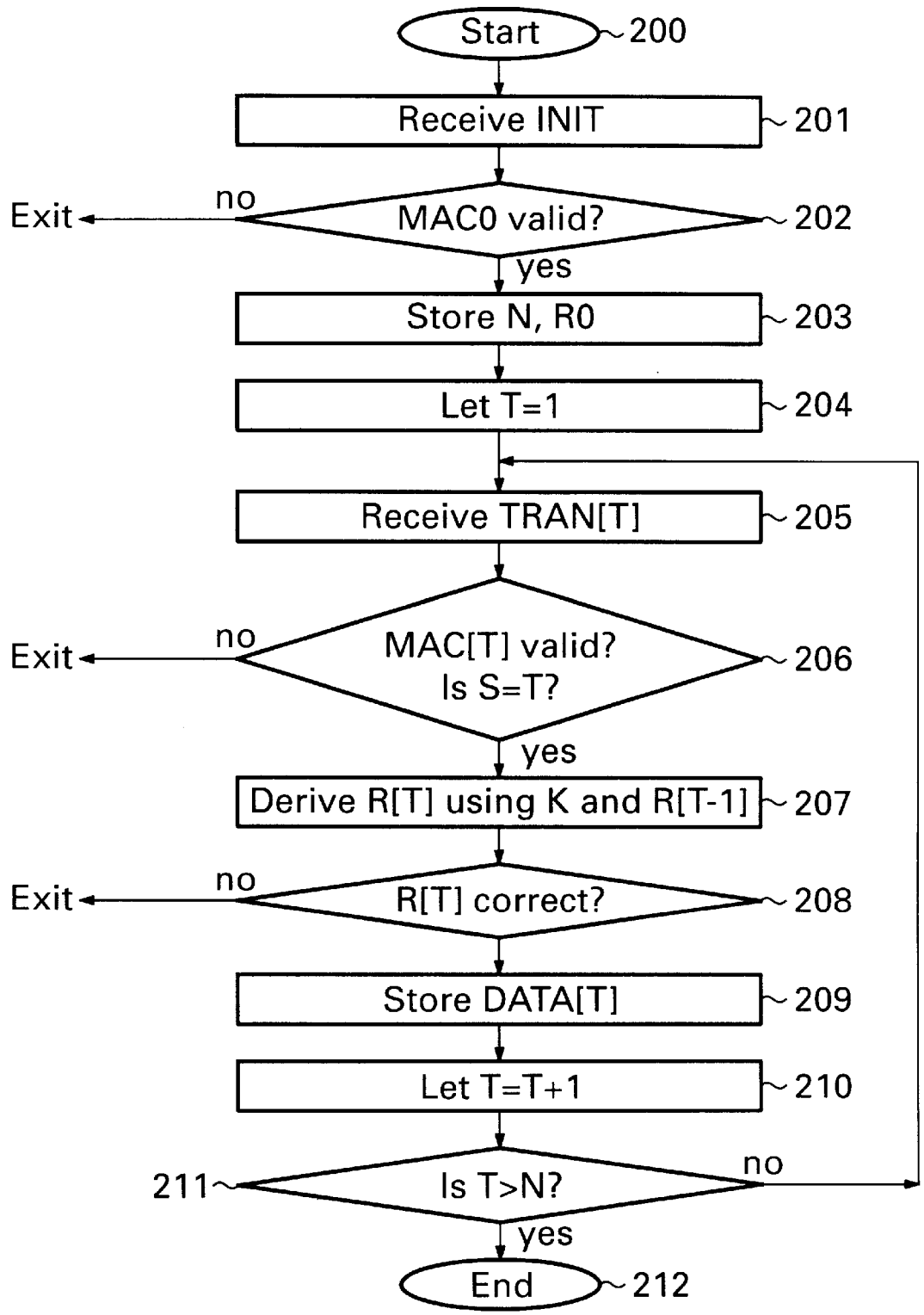
FIG. 5 schematically shows by way of exemple how a set of commands may be processed by the card according to the method of the present invention.

The method of the invention, as depicted schematically and by way of example in FIGS. 4 and 5, involves the transfer of data from an outside source (e.g. an application provider) to a card, such as the card 1 of FIG. 1. The transfer of data according to the invention involves producing a set of commands such as depicted in FIG. 3. An initiation command (INIT) is followed by one or more transfer commands (TRAN). All commands comprise parameters (R0, R1, . . . , N, . . . ) and all transfer commands comprise data (DATA1, DATA2, . . . ). The parameters comprise authentication values (R0, R1, . . . ). Associated with each command is an authentication code (MAC0, MAC1, . . . ). The way this set of commands ("script") is produced is explained with reference to FIG. 4.

The procedure is initiated in step 100. In step 101, the number of transfer commands (TRAN) is determined. Data items to be loaded in the smart card are preferably arranged in a table beforehand. The number of data items (N) determines the number of commands (TRAN) necessary to load the data items into the card. The number (N) of transfer commands can then be determined by e.g. counting the number of items in the table (not shown).

In step 102, the initial authentication value R0 is fetched. The value R0 may be predetermined, but is preferably generated by e.g. a random number generator. The value R0 is temporarily stored for later use.

In step 103, the initiation command (INIT) is produced by assembling the command code proper, the value R0 and the number N. An authentication code MAC0 is calculated in step 104. The code MAC0 may e.g. be calculated according to the ANSI (American National Standardization Institute) X9.19 standard using triple encryption. In step 104 the initiation command INIT and its associated authentication value MAC0 are (temporarily) stored.

In step 106, a loop is initiated in which the transfer commands and their authentication codes and authentication values are determined. The transfer commands are preferably provided with a sequence number (S), which is set to 1 in step 106.

In step 107, the authentication values R1, R2, . . . may be derived from the initial authentication value R0 by e.g. using a random number generator. Alternatively, a message authentication code process (e.g. according to the ANSI X9.19 standard) may be employed for producing the authentication values, the resulting "MAC" being used as authentication value. In this process, one or more keys may be used, such as the secret key K.

In the procedure of FIG. 4, the derivation of authentication values (R) should be performed at least N times. It should be noted that an even greater security can be achieved by using e.g. every other derived value, that is by skipping values, in which case the derivation should take place more than N times. The authentication values R1, R2, . . . should be related, i.e. derived from each other, but need not be successive results of the derivation process. Thus, only e.g. R0, R2, R4, . . . could be used.

In step 108, the data to be transferred are fetched, e.g. from the data table mentioned earlier. These data are used in step 109 to produce the transfer (TRAN) command, which comprises the command proper (instruction code), an authentication value (R[N]), the sequence number (S), and the data (DATA[N]). In step 110, an authentication value (MAC[N]) is calculated like in step 104. The transfer command and its associated authentication code are stored in step 111.

After incrementing the sequence number S in step 112, the sequence number S is compared with the number N of data items in step 113. If all data items have been processed, this part of the method is terminated in step 114. Otherwise, control returns to step 107.

In FIG. 5 it is shown how the set of commands produced according to FIG. 4 is processed by the smart card. After activation of the card in step 200, the initiation command (INIT) is received in step 201. First, its authentication code (MAC0) is verified in step 202. This preferably involves the re-calculation of the authentication code and comparing the re-calculated code (MAC0') with the received code (MAC0). If the code is valid, the procedure is continued with step 203. Otherwise, the procedure is exited. After an exit, special measures may be taken, such as producing a request for retransmission. For the sake of clarity, this is not shown in FIG. 5.

In step 203, the values of N and R0 (initial authentication value) contained in the initiation command are stored for later use. Preferably, the card is put into a mode in which only transfer commands can be accepted, thus preventing the interruption of the procedure. Preferably, the card remains in this "locked", that is transfer-only state until all transfer commands have been received. As stated above, the total number (N) of transfer commands is contained in the INIT command.

Step 204 prepares for a loop in which the transfer commands are processed. A counter T, which corresponds with the sequence number S of FIG. 4, is set to one.

In step 205 a transfer command (TRAN) is received. The first time step 205 is executed, the first transfer command TRAN1 will be received. It will be understood that all commands may be "received" virtually simultaneously, and that in step 205 the actual processing of the individual transfer commands begins. The first transfer command, as shown in FIG. 3, has the structure:

TRAN(R1, 1, DATA1, . . . ), MAC1, where TRAN represents the command proper, R1 is the first subsequent (that is, second) authentication value, 1 is the sequence number (S), DATA1 is the data contained in the command, and MAC1 is the authentication code of the command.

In step 206 of FIG. 5 a double test is performed. First, the authentication code MAC[T] of the transfer command is checked for its validity, e.g. by reproducing the code and comparing the result (e.g. MAC1') with the received code (e.g. MAC1). If the codes are not equal, the routine is exited, following which the command is rejected and a re-transmission request may be issued. The card may contain the key or keys necessary for producing an authentication code. It will be understood that instead of reproducing the code, some other validity check may be employed.

Furthermore, the card checks the received sequence number S to see that all transfer commands are received in the correct order. If the received sequence number S is not equal to the counter T, the routine is exited, as described above.

If both the authentication code and the sequence number are found to be valid, the routine continues with step 207, in which the authentication value R is derived from the previous value. In case the first transfer command is being processed (T=1), R1 is derived from R0 using a key K. This derivation in step 207 corresponds to the derivation in step 107 of FIG. 4.

The correctness of R is checked in step 208. If the derived authentication value (R') is not identical to the received value (R), the routine is exited. This ensures that all transfer commands are authentic, i.e. provided with interrelated authentication values as derived in the routine of FIG. 4.

If the authentication value R is found to be correct, data contained in the transfer command are stored. In general, these data may be stored in the memory of the card. However, if the data comprise card commands, i.e. instructions for the processor of the smart card, these card commands may be directly executed. In the latter case, the transfer command may load the smart card command concerned directly into the instruction register of the smart card processor and make the processor execute the command. Transfer commands may comprise a flag to indicate the nature of the transferred data (commands or other data) and their destination (memory or instruction register). The direct execution of transferred card commands provides an effective way of loading data onto a card, or of changing and/or creating data structures on a card.

After storing of otherwise processing the data in step 209, the counter T is incremented in step 210. Subsequently, in step 211, the value of T is compared with the (expected) number of transfer commands. If all transfer commands have been processed, the routine is terminated in step 212, and the state in which (preferably only) transfer commands are accepted is discontinued. Otherwise, the next transfer command is received in step 205.

The sequence number S contained in the transfer commands serve several purposes. In the first place, they provide a mechanism to check the correct order in which the transfer commands are received and processed. In the second place, they provide a mechanism to resume an interrupted sequence of transfer commands. If for example a transmission error occurs and the routine of FIG. 5 is exited after, say, 5 out of 10 a series of transfer commands have been processed, the last sequence number S and/or the counter T can be used to resume the processing at the correct command when the series of commands is retransmitted. Also, the last sequence number S and/or the counter T can be used to undo the effect of the transfer commands which were processed. In order to undo the transfer commands of the failed series, a new series of commands may be provided which has the effect of deleting or undoing the results of the first series.

In the examples set out above, it is assumed that the card reproduces the authentication values R1, R2, etc. As this requires a certain amount of processing power and processing time, it is possible to simplify the procedure by using the authentication code of each preceding command as authentication value. Referring to FIG. 3, this would imply that the value of R1 is chosen to be equal to MAC0, R2 is equal to MAC1, etc. The initial authentication value R0 may, in that case, be omitted. Such a scheme has the advantage of a greater speed and simplicity at the cost of a less effective security. In order to increase the level of security in the simplified procedure, it is possible not to use the (preceding) authentication code proper, but a value derived from the code as authentication value: R2=F(MAC1), where F is for example a hash or parity function.

A series of commands, as e.g. depicted in FIG. 3, may be offered to one or more cards. In order to control the distribution of a specific series of commands, the initiation command (INIT) preferably comprises a distribution profile (DP) wich is compared with a card profile (CP) stored in the card. The initiation command is only executed if the distribution profile (DP) and the card profile (CP) match. The profiles may contain e.g. 16 bytes of user and/or card related information. The distribution profile contains information specific for a set of cards and may therefore contain wildcards which are replaced by corresponding information of the card profile before the profiles are compared. The term "match" should therefore be understood to include the corresponding of wildcards. The profiles can be used for only checking the authorization of the card by including in the service profile a flag indicating that the card is not to be put in the transfer commands accepting mode. By way of example it is assumed that each profile comprises 16 bits. The profiles:

CP=1001 0001 1010 0111 and

DP=1001 0001 1010 1001 match if the four least significant bits are considered as wildcards, i.e. are not taken into consideration. In other words, the distribution profile:

DP=1001 0001 1010 1001

"matches" all card profiles having 1001 0001 1010 as the first 12 digits. Cards having another card profile (CP) will not execute the initiation command and will thus not allow their data to be modified.

The method of the invention, as will be apparent from the above, involves basically three stages:

1. Producing a set of commands, i.e. one initiation command and as many transfer commands as required to transfer the data in question. This involves producing a set of interrelated authentication values. Each command is further provided with an authentication code (MAC).
2. Transmitting the set of commands to the card.
3. Executing the commands on the card after checking the authentication code of each command. The executing involves in the case of the transfer commands the checking of i.a. the authentication values and then the loading of the relevant data in memory or (in the case of a card command) in the instruction register of the processor of the card.

The method of the present invention thus enables the secure transfer of data, e.g. card commands, to a smart card by providing a double protection mechanism: the related authentication values guarantee that the sequence of received data is unaltered, while the authentication codes accompanying each command provide protection of the transferred data. In the case where the transferred data are smart card commands, the method thus provides protection of non-protected commands.

Figure 6:
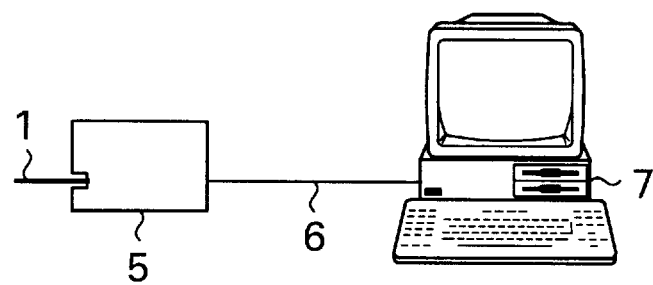
FIG. 6 schematically shows a system for modifying data on a smart card.

A system for modifying data on a smart card is schematically shown by way of example in FIG. 6. The system comprises a card reader/writer 5 connected by a data link 6 to a computer 7. A smart card 1 is inserted in the card reader/writer 5. A set of commands, as e.g. represented in the table of FIG. 3, is prepared in the computer 7. Then the commands of the set are sent via the data link 6 to the card reader/writer 5, which transfers the commands to the smart card 1. The smart card executes the commands as described above, thus storing the relevant data in its memory.

It will be understood by those skilled in the art that the embodiments described above are given by way of example only and that many modifications and additions are possible without departing from the scope of the present invention.

We claim:

1. A method of securely modifying data in a smart card (1), the method comprising the steps of:
   producing an initiation command (INIT) comprising an initial authentication value (R0) and producing an initial authentication code (MAC0) based on the command and the initial value (R0),
   producing at least one transfer command (TRAN) comprising data (DATA) to be transferred and producing a subsequent authentication code (MAC1, MAC2, ...) based on both the command (TRAN) and a subsequent authentication value (R1, R2, ...) derived from the initial value (R0),
   transferring the commands and their authentication codes thus produced to the smart card (1),
   authenticating the commands in the smart card (1) by checking the authentication codes (MAC0, MAC1, ...) and checking the subsequent authentication values (R1, ...) derived from the initial value (R0), and
   storing the transferred data (DATA) in the card.

2. A method according to claim 1, wherein the initiation command (INIT) further comprises the number of transfer commands (N).

3. A method according to claim 1, wherein the initiation command (INIT) is arranged to prohibit the card (1) from accepting commands other than transfer commands (TRAN).

4. A method according to claim 1, wherein each transfer command (TRAN) further comprises a sequence number (SN).

5. A method according to claim 1, wherein the transfer data (DATA) comprise a card command (e.g. UPDATE).

6. A method according to claim 5, wherein a card command (e.g. UPDATE) is directly executed upon transfer to the card.

7. A method according to claim 5, wherein a card command is a protected command according to the ETSI (European Telecommunications Standardization Institute) TE9-recommendation, the value needed for protecting the command corresponding with the authentication value.

8. A method according to claim 1, wherein the authentication codes (MAC1, MAC2, ...) are generated according to the ANSI X9.19 standard.

9. A method according to claim 1, wherein deriving the subsequent values (R1, R2, ...) involves the use of a secret key (K).

10. A method according to claim 1, wherein the initiation command (INIT) comprises a distribution profile (DP) and the card comprises a card profile (CP), and wherein the initiation command is only executed if the distribution profile (DP) and the card profile (CP) match.

11. A method according to claim 1, wherein the initiation command (INIT) puts the card (1) in a transfer state in which only transfer commands (TRAN) are executed.

12. A method according to claim 11, wherein the card (1) remains in the transfer state until it has received all transfer commands (TRAN), as indicated by the number (N) of transfer commands contained in the initiation command (INIT).

* * * * *